Dec. 29, 1964  R. L. BURTNER  3,163,377
MAP MATCHING NAVIGATION CONTROL SYSTEM FOR AIRCRAFT
Filed Aug. 17, 1951  2 Sheets-Sheet 1
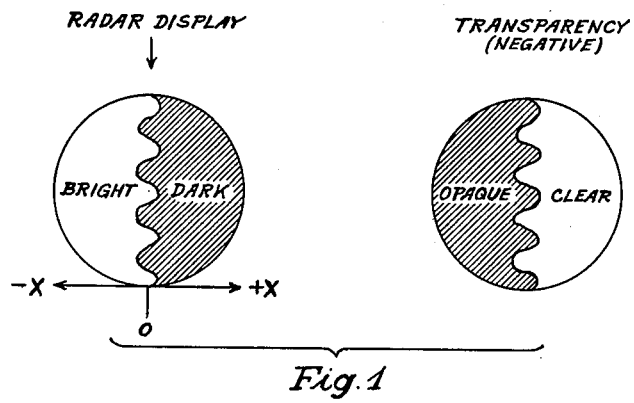
Fig. 1
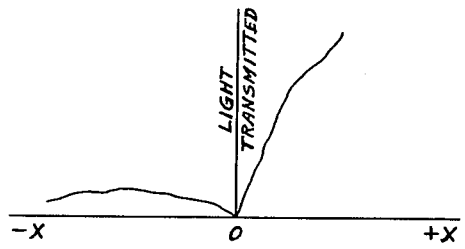
Fig. 2
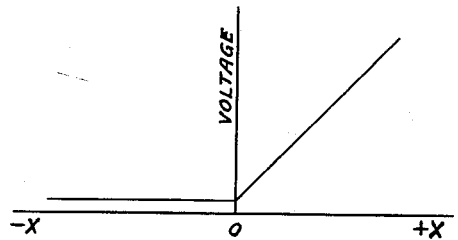
Fig. 3
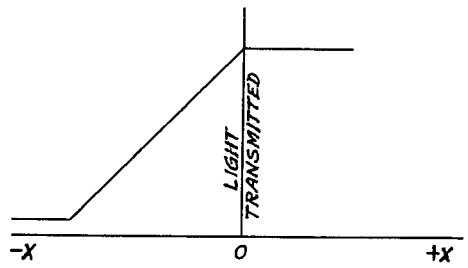
Fig. 4
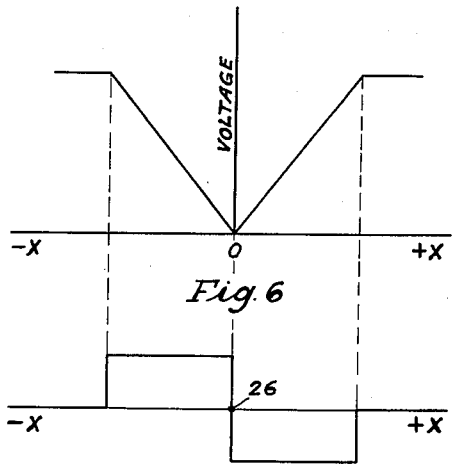
Fig. 6
Fig. 7
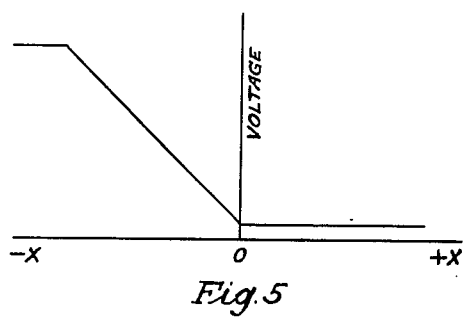
Fig. 5
INVENTOR.
Richard L. Burtner
BY
ATTORNEY

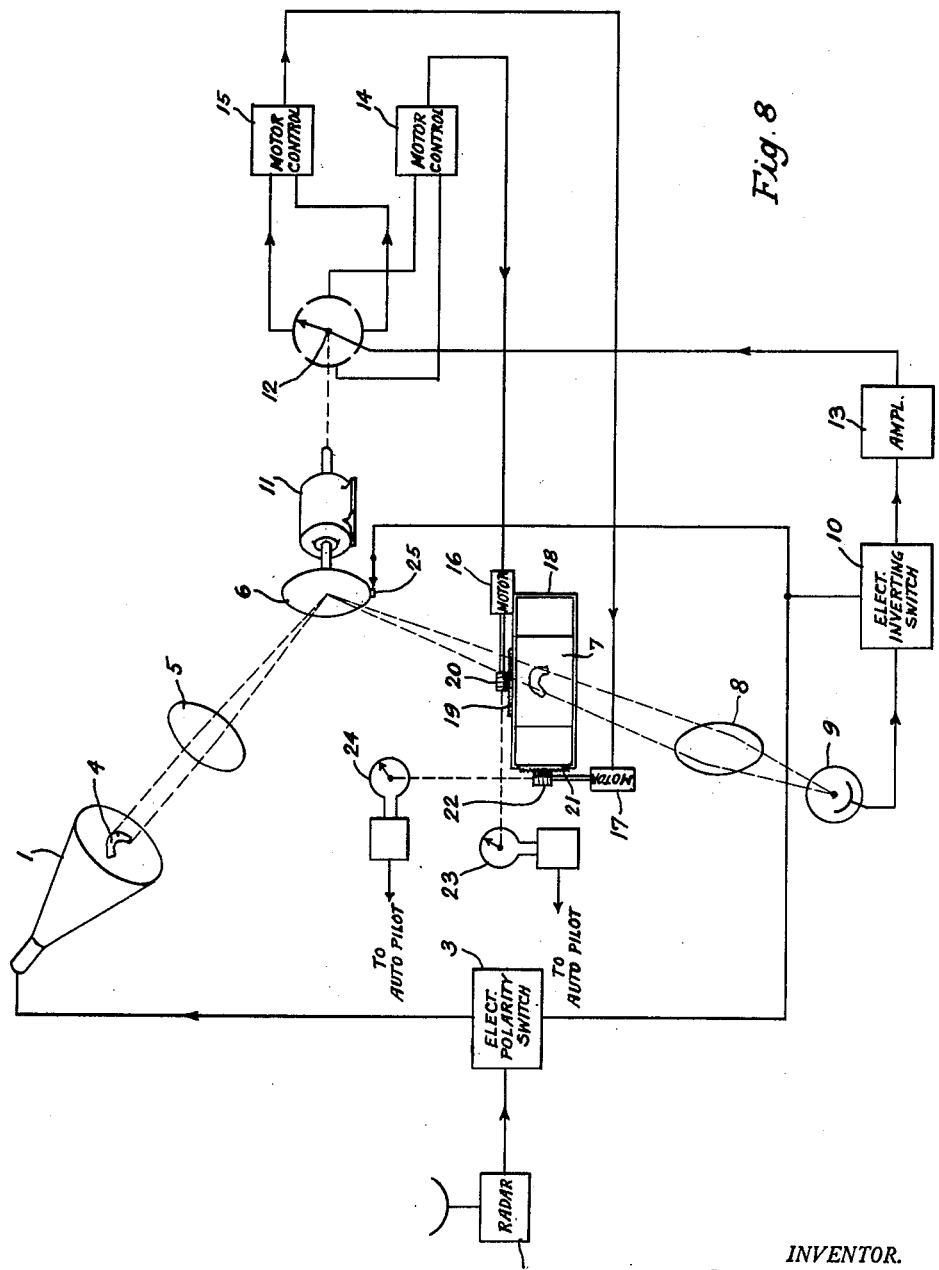

United States Patent Office 3,163,377
Patented Dec. 29, 1964

3,163,377
MAP MATCHING NAVIGATION CONTROL SYSTEM FOR AIRCRAFT
Richard L. Burtner, Canton, Ohio, assignor to Goodyear Aerospace Corporation, a corporation of Delaware
Filed Aug. 17, 1951, Ser. No. 242,271
7 Claims. (Cl. 244—14)

This invention relates to apparatus for guiding and/or indicating the position of aircraft or the like and, more particularly, is concerned with apparatus associated with the aircraft for indicating or controlling the flight path of aircraft over areas where large land-water boundaries exist.

It has been proposed heretofore in the patent application of Meneley and Langworthy, Serial No. 66,048, filed December 18, 1948, to provide guidance for a pilotless aircraft or the like by the automatic comparison of a radar-display image of the terrain over which the aircraft is flying with stored reference information in the form of an opposite-contrast reference map transparency having substantially the same scale and orientation as the radar display image. While the apparatus described in the above-identified application is effective in indicating or controlling the position of the aircraft over land terrain that has considerable variation in detail, difficulty is sometimes encountered in cases where the map contains a large land-water boundary, or any other terrain features which cause the contrast map to consist of two areas, one essentially light and one essentially dark.

It is the general object of this invention to improve upon prior art practices by the provision of an apparatus for automatically indicating or controlling the flight path of aircraft over terrain which is entirely or partially void of contrasting detail except for a division into a dark and light area, such as exists at a land-water boundary.

Another object of this invention is to provide a means for producing the proper transmission versus displacement function for determining a match position between a radar display image and a previously prepared map by periodically reversing the contrast of the radar display image.

The foregoing and other objects of the invention which will become apparent as the description proceeds are achieved by providing means, such as a radar screen, for producing a substantially instantaneous radar display image of the terrain over which the aircraft is flying. The display image is projected onto a negative contrast reference map of the terrain to be navigated, the map and image having substantially the same scale and orientation. Means is provided in the path of the projected image to effect nutational movement between the map and display image. Motor means associated with the map serves to move the map in a plane transversely of the light path of the projected display image. Photocell means in back of the map is responsive to the light passing through the map from the projected image source. An electronic polarity switch is associated with the radar means for periodically reversing the contrast of the radar image and a similar electronic switch periodically inverts the output of the signal of the photocell means. Pulse-generating means, actuated periodically by the nutating means, simultaneously triggers the electronic switches so that the polarity of the output signal of the photocell means is inverted simultaneously with the reversing of the contrast of the radar display image. Means responsive to the output signal of the photocell means and associated electronic switch controls the motor means for maintaining alignment between the radar display image and the reference map.

For a better understanding of the invention, reference should be had to the accompanying drawings, wherein:

FIG. 1 shows a typical radar display image and the corresponding reference map transparency as it might appear along a land-water boundary;

FIG. 2 is a graphical representation of the variation in light falling on the photocell as the transparency and radar display are moved laterally relative to each other;

FIG. 3 is an idealized graphical representation of the curve of FIG. 2, showing the voltage variation of the photocell output as a function of the displacement of the radar display relative to the map transparency;

FIG. 4 is an idealized graphical representation of the variation in light with displacement when the contrast of the radar display is reversed;

FIG. 5 is a graphical representation of the voltage versus displacement when the output signal of the photocell is inverted;

FIG. 6 is a composite curve resulting from the addition of the voltages of FIGURES 3 and 5;

FIG. 7 is a dynamic characteristic as derived from the curve of FIG. 6 and is the graphical representation of the error signal appearing across opposed segments of the commutator as a function of displacement of the map and image; and FIG. 8 is a diagrammatic representation of the essential elements of the invention.

It will be understood that the present invention provides apparatus for scanning a radar image over a portion of a previously prepared map and the development of lateral and longitudinal error signals, and provides apparatus for using these error signals for aligning the map with the radar image, the relative alignment providing guidance for the aircraft along a planned flight path.

The apparatus for maintaining alignment between the map and image for proper functioning requires that a substantially symmetrical voltage versus displacement relationship exist as the image is displaced in any direction from the condition of exact match. Such an ideal relationship is shown graphically in FIG. 6. However, where the map and image are made up of only two contrasting areas, as exists in a map of an area along a land-water boundary, such a symmetrical condition does not exist, movement of the image relative to the map providing a voltage versus displacement curve substantially as indicated in FIG. 3. The apparatus hereinafter described achieves what is in effect a symmetrical voltage versus displacement relationship from the unsymmetrical condition existing along a land-water boundary.

With specific reference to the form of the invention illustrated in FIG. 8, the numeral 1 indicates a plan position indicator (PPI) radar scope for producing a substantially instantaneous radar display image of the terrain over which the aircraft is flying. The signal controlling the radar picture tube is derived from a radar transmitter-receiver means indicated at 2. An important feature of the invention is an electronic polarity reversing switch 3 which periodically inverts the output signal of the radar means 2 going to the radar scope for reversing the dark and bright areas of the display image, the dark and bright areas being a function of the control signal voltage in a manner well known to the radar art.

The radar display image 4 appearing on the screen of the radar scope 1 is directed by a lens 5 against a mirror 6, from which it is reflected to a reference map 7. The map 7 may be made from actual radar photographs obtained by flying a similar radar over the area before the controlled aircraft flight, or may be made by other methods, such as utilization of an ultrasonic radar trainer operating over a built-up model of the terrain over which the aircraft is to fly. The map 7 covers a larger area than that presented by the radar display tube and is usually in the form of a film transparency.

Light from the projected display image passes through the map 7 and is directed through a condensing lens 8 onto a photocell or other light-sensitive means 9.

The output signal of the photocell 9 is inverted by means of an electronic polarity reversing switch 10 that is actuated simultaneously with the switch 3 by means hereinafter described.

The mirror 6 is mounted on the shaft of a motor 11, the plane of the mirror being tipped slightly from the perpendicular with respect to the axis of the rotating shaft of the motor. This imparts a wobble to the plane of the mirror as it is rotated by the motor, which in turn causes the reflected image to scan in a small circular motion in the plane of the reference map 7. This systematic scanning movement between the display image and the reference map, hereinafter referred to as nutation of the display image, is an essential feature of the navigational system in maintaining a match between the reference map 7 and the radar display image 4 by introducing a directional sense to any displacement error therebetween.

It is desirable to synchronize the switching action of the switches 3 and 10 with the scanning movement of the display image so that a reversal occurs on the completion of each scan cycle of the display image. To this end, an auxiliary switch 25 is provided which is actuated by rotation of the mirror 6. Once each revolution, the switch 25 is momentarily "closed," triggering the switches 3 and 10.

Associated with the shaft of the motor 11 is a commutator 12. The commutator has four segments which are successively connected to the output of the phototube amplifier 13. Opposed pairs of segments of the commutator 12 are connected to a right-left motor control circuit indicated generally at 14, the remaining two opposed segments being connected to a fore-aft motor control circuit, indicated generally at 15, "fore-aft" and "right-left" referring to the movement of the map relative to the desired course of the aircraft. (The desired course of the aircraft is preferably from bottom to top across the center of the reference map.) Thus, the amplified output of the photocell amplifier 13 is commutated synchronously with the nutation of the projected radar image as effected by the rotating mirror 6 into fore-aft and right-left components. The motor control circuits 14 and 15 are responsive to the difference in potential on the opposed segments of the commutator, this difference in potential being in effect an error signal indicative of mismatch between the projected radar image and the reference map in either the fore-aft or the right-left direction. The motor control circuits 14 and 15 are connected to motors 16 and 17 respectively, which move the reference map 7 in a manner hereinafter described to reduce the error voltage developed across opposed segments of the commutator to zero.

Reference map 7 is mounted for universal movement in a plane transverse to the light path of the projected radar image. Any suitable means may be employed to effect movement of the reference map in a lateral or vertical movement relative to the projected image of the radar display. One such suitable mechanism is shown diagrammatically in FIG. 8, in which the map is slidably carried for lateral movement in a frame indicated generally at 18. Lateral movement of the map is effected by the motor 16 by means of a worm rack 19 along one edge of the map, the rack engaging a worm 20 driven by the motor 16. Vertical movement is effected by means of a worm rack 21 associated with the frame 18 which engages a worm 22 driven from the shaft of the motor 17. Thus, rotation of the motors 16 and 17 results in movement of the reference map 7 in the lateral or right-left direction and the vertical or fore-aft direction.

Potentiometers 23 and 24 are coupled to the motors 16 and 17. A signal representative of the relative position of the map 7 in either the fore-aft or right-left direction is derived from the potentiometers. This information is applied to the autopilot (not shown) to control or indicate the flight path of the aircraft in a conventional manner.

Operation of the invention can best be understood by reference to FIGURES 1 through 6, in which FIG. 1 shows a typical radar display of a coastal area, the radar display being essentially divided into two areas of different contrast, one area corresponding to the land mass, and the other area corresponding to the water area. FIG. 1 also shows the corresponding negative transparency map of the same area. It is evident that if the transparency is superimposed upon the radar display image, movement of the radar display to the right in the $+x$ direction will result in light from the bright area of the radar display being transmitted by the clear area of the negative transparency, while movement to the left in the $-x$ direction will result in overlapping of the dark area of the radar display with the opaque area of the map transparency with very little transmission of light by the map transparency. This variation in transmitted light is shown in graphical form in FIG. 2, which shows the variation in light transmitted by the map transparency as the radar display is moved in the $+x$ or $-x$ direction relative thereto. The voltage output of the photocell is indicated in idealized graphical form in FIG. 3, showing that there is no change in the output voltage signal until the radar display is shifted sufficiently to the right to cause the bright area to move into position opposite the clear area of the transparency.

If the right and dark areas of the radar display image are interchanged, such as is effected by the electronic polarity reversing switch 3, the variation in the output voltage of the photocell with the relative movement of the radar display image and the map transparency will be substantially as indicated in FIG. 4. Thus, as the radar display image is moved to the right, the bright area will fall entirely upon the clear area of the map transparency, but movement of the radar display image to the left will result in the bright area of the radar display image being intercepted by the opaque area of the map transparency so that the light level drops off with movement of the radar display in the $-x$ direction. By inverting the output voltage signal of the photocell, as is effected by the electronic switch 10, the variation in voltage with displacement becomes that as indicated in FIG. 5. The composite voltage signal resulting from the alternate reversals of the contrasting area of the radar display image and of the output voltage signal of the photocell is the symmetrical curve of FIG. 6, which is the desired static characteristic for maintaining alignment of the map and radar display image.

The output signal of the photocell amplifier 13, which varies with the relative displacement of the radar display image and the map transparency, as indicated in FIG. 6, is applied to the commutator 12 and commutated in the usual manner. The resulting error signal appearing across the "right-left" pair of opposed segments of the commutator is indicated by the curve of FIG. 7 and is effectively the derivative of the curve of FIG. 6. As the display image shifts from the match condition, as indicated at 26 in FIG. 7, a corrective signal is developed which is applied to the motor control circuit to adjust the map to bring the map back into alignment with the display image.

From the above description, it will be appreciated that the objects of the invention have been achieved by the provision of an apparatus which gives improved matching data where the flight of the aircraft is along a large land-water boundary. The system described requires only a slight modification of the single match system described in the above-mentioned co-pending application, which operates only over terrain having considerable contrasting details.

While certain representative embodiments and details have been shown for the purpose of illustrating the invention, it will be apparent to those skilled in this art that various changes and modifications may be made therein without departing from the spirit or scope of the invention.

I claim:

1. Apparatus for controlling the flight of an aircraft or the like along a land-water boundary, said apparatus including radar means for producing a substantially instantaneous radar image of the terrain over which the aircraft is flying, a negative contrast reference map of the terrain to be navigated, said map and image having substantially the same scale and orientation, means for projecting the image onto the map, motor means for moving the map in a plane transversely of the light path of the projected radar image, means for effecting nutational movement between the map and projected image, photocell means responsive to the light passing through the map from the projected image, an electronic polarity inverting switch associated with said radar means for periodically reversing the contrast of the radar image, an electronic switch for periodically inverting the output signal of said photocell means, pulse generating means, the output signal of which synchronously triggers said electronic switches, said pulse generating means being actuated by said nutating means, and means responsive to the output signal of said electronic switch as derived from said photocell means for controlling said motor means to maintain a substantial match condition between the map and image.

2. Apparatus for controlling the flight of an aircraft or the like along a land-water boundary, said apparatus including radar means for producing a substantially instantaneous image of the terrain over which the aircraft is flying, a reference map of the terrain to be navigated, said map and image having substantially the same scale and orientation, means for projecting the image onto the map, motor means for moving the map in a plane transversely of the light path of the projected image, means for effecting nutational movement between the map and projected image, photocell means responsive to the light passing through the map from the projected image, an electronic polarity inverting switch associated with said radar means for periodically reversing the contrast of the radar image, an electronic switch for periodically inverting the output signal of said photocell means, pulse generating means, the output signal of which synchronously triggers said electronic switches, said pulse generating means being actuated by said nutating means, and means responsive to the output signal of said electronic switch as derived from said photocell means for controlling said motor means to maintain a substantial match condition between the map and image.

3. Apparatus for controlling the flight of an aircraft or the like along a land-water boundary, said apparatus including radar means for producing a substantially instantaneous image of the terrain over which the aircraft is flying, a reference map of the terrain to be navigated, said map and image having substantially the same scale and orientation, means for projecting the image onto the map, motor means for moving the map in a plane transversely of the light path of the projected image, means for effecting nutational movement between the map and projected image, photocell means responsive to the light passing through the map from the projected image, means associated with said radar means for periodically reversing the contrast of the radar image, means for periodically inverting the output signal of said photocell means, pulse generating means, the output signal of which synchronously triggers said inverting and reversing means, and means responsive to the output signal of said electronic switch as derived from said photocell means for controlling said motor means to maintain a substantial match condition between the map and image.

4. Apparatus for controlling the flight of an aircraft or the like along a land-water boundary, said apparatus including radar means for producing a substantially instantaneous image of the terrain over which the aircraft is flying, a reference map of the terrain to be navigated, said map and image having substantially the same scale and orientation, motor means for moving the map in a plane transversely of the light path of the projected image, means for effecting nutational movement between the map and projected image, photocell means responsive to the light passing through the map from the projected image, means associated with said radar means for periodically reversing the contrast of the radar image, means for periodically inverting the output signal of said photocell means, pulse generating means, the output signal of which synchronously triggers said inverting and reversing means, and means responsive to the output signal of said electronic switch as derived from said photocell means for controlling said motor means to maintain a substantial match condition between the map and image.

5. Automatic terrain recognition and navigation apparatus for aircraft or the like including means for producing a substantially continuous image of the terrain over which the aircraft is passing, a previously prepared map transparency of the terrain, means for superimposing the map and image, said map and image having substantially the same scale and orientation, means for effecting a scanning movement between the image and map, switching means associated with said image producing means for periodically reversing the contrast of the image, light sensitive means responsive to the light from said image transmitted through said map, signal inverting means for periodically inverting the output signal of said light sensitive means, pulsing means actuated by said scanning means for triggering said switching means and signal inverting means simultaneously at the completion of each scanning cycle, means for effecting relative repositioning movement between said map and image, and means responsive to the output signal of said signal inverting means for controlling said repositioning means to effect and maintain a match condition between said map and image.

6. Automatic terrain recognition and navigation apparatus for aircraft or the like including means for producing a substantially continuous image of the terrain over which the aircraft is passing, a previously prepared map transparency of the terrain, means for superimposing the map and image, said map and image having substantially the same scale and orientation, means for effecting a scanning movement between the image and map, switching means associated with said image producing means for periodically reversing the contrast of the image, light sensitive means responsive to the light from said image transmitted through said map, signal inverting means for periodically inverting the output signal of said light sensitive means, pulsing means for triggering said switching means and signal inverting means simultaneously, means for effecting relative repositioning movement between said map and image, and means responsive to the output signal of said signal inverting means for controlling said repositioning means to effect and maintain a match condition between said map and image.

7. Automatic terrain recognition and navigation apparatus for aircraft or the like including means for producing a substantially continuous image of the terrain over which the aircraft is passing, a previously prepared map transparency of the terrain, means for superimposing the map and image, said map and image having substantially the same scale and orientation, means for effecting a scanning movement between the image and map, switching means associated with said image producing means for periodically reversing the contrast of the image, means responsive to the light from said image transmitted through said map, means for periodically inverting the output signal of said light sensitive means, pulsing means for triggering said switching means and signal inverting means simultaneously, means for effecting relative repositioning movement between said map and image, and means responsive to the output signal of said signal inverting means for controlling said repositioning means to effect and maintain a match condition between said map and image.

No references cited.

SAMUEL FEINBERG, *Primary Examiner.*

NORMAN H. EVANS, *Examiner.*